United States Patent [19]
Goel

[11] Patent Number: 4,739,031
[45] Date of Patent: Apr. 19, 1988

[54] NOVEL POLY(ARYLENE ETHER-AMIDE) POLYOLS AND THEIR APPLICATION IN POLYURETHANE POLYMERS

[75] Inventor: Anil B. Goel, Worthington, Ohio

[73] Assignee: Ashland Oil, Inc., Ashland, Ky.

[21] Appl. No.: 48,711

[22] Filed: May 12, 1987

[51] Int. Cl.$^4$ .................... C08G 18/28; C08G 65/40; C08G 8/28
[52] U.S. Cl. .................................. 528/211; 525/504; 528/73
[58] Field of Search ................... 528/211, 73; 525/504

[56] References Cited

U.S. PATENT DOCUMENTS 4,562,240 12/1985 Goel et al. ............................ 528/73
4,584,363 4/1986 Goel et al. ............................ 528/73
4,639,505 1/1987 Goel .................................... 528/211

Primary Examiner—Harold D. Anderson
Assistant Examiner—Dennis R. Daley
Attorney, Agent, or Firm—John F. Jones

[57] ABSTRACT

A process for preparing novel poly(arylene ether-amide) polyols and their use in the formation of polyurethanes wherein the poly(arylene ether-amide) polyols are formed by reaction of a bicyclic amide acetal with a polyphenolic compound are described.

8 Claims, No Drawings

NOVEL POLY(ARYLENE ETHER-AMIDE) POLYOLS AND THEIR APPLICATION IN POLYURETHANE POLYMERS

This invention relates to new poly(arylene ether-amide) polyols, to a process for preparing them by the reaction of polyphenolic compounds with bicyclic amide acetals and to the use of these polyols in the synthesis of polyurethanes.

The reaction of polyphenolic compounds, that is to say, compounds containing more than one phenolic hydroxyl group per molecule, with oxirane containing organic reagents such as ethylene or propylene oxide have been known to produce poly(arylene ether) polyols. The production of poly(arylene ether-amide) polyols by the reaction of polyphenolic compounds with bicyclic amide acetals has not previously been described. The poly(arylene ether-amide) polyols embodied in this invention are also previously unknown to those skilled in the art.

The poly(arylene ether) polyols of the prior art which are produced by the reaction of an epoxide such as ethylene oxide or propylene oxide and a polyphenolic compound are known to form polyurethanes of improved toughness, moisture resistance and the like when copolymerized with polyisocyanates. It is also well known that in the synthesis of these poly(arylene ether) polyols it is difficult to control the reaction and that often the reaction proceeds to a greater extent than desired. Thus the resulting polyols tend to have higher molecular weight than is often desired.

I have discovered that polyphenolic compounds can be caused to react in precise stoichiometry with bicyclic amide acetals (one mole of bicyclic amide acetal per aromatic hydroxy group in the polyphenolic compound) to produce previously unknown poly(arylene ether-amide) polyols.

Bicyclic amide acetals useful in the present invention are those which correspond to formula I:

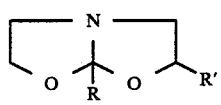

wherein R and R' independently represent hydrogen, an alkyl or an alkyl ether group having from 1 to 20 carbon atoms, an aryl or aryl ether group having from 6 to 12 carbon atoms, an alkaryl or an alkaryl ether group having from 7 to 20 carbon atoms.

Polyphenolic compounds useful in this invention are compounds which may be monomeric, oligomeric or polymeric and have more than one aromatic hydroxyl group per molecule. Specific polyphenolic compounds embodied in the present invention include Bisphenol-A, Bisphenol-F, resorcinol, 2,2'-biphenol, 4,4'-biphenol, dihydroxynaphthalene, phenol/formaldehyde resins such as novolacs and resoles, tetrachloro Bisphenol-A, 4,4'-sulfonyl diphenol, and the like.

In the process of this invention the reaction of a polyphenolic compound with a bicyclic amide acetal, as shown by the following equation, can be carried out at temperatures ranging from about 50° C. to about 150° C. and preferably from about 60° to 120° C. Generally this reaction is an exothermic reaction.

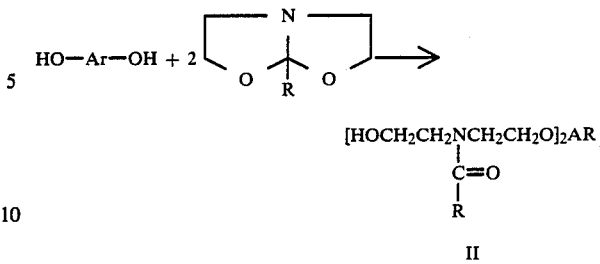

Thus, when Bisphenol-A was allowed to react with a methyl substituted bicyclic amide acetal (Formula I wherein R represents a methyl group and R' represents hydrogen) in a 1:2 molar ratio at about 80° C., an exothermic reaction occurred to give a viscous liquid diol (II) having arylene ether-amide groups in the backbone. Most of the poly(arylene ether-amide) polyols of this invention have been found to be miscible with chain poly(alkylene ether) polyols and polyester polyols. Usually, the poly(arylene ether-amide) polyols exhibit higher solubility in polyols when compared to their parent polyphenolic compounds. Thus, blends of the poly(arylene ether-amide) polyols of this invention with known polyol chain extenders, cross-linkers and long chain polyols can be used in the synthesis of polyurethane polymers by the copolymerization of such blends with polyisocyanates. The use of the polyols of the present invention in the preparation of polyurethanes usually helps improve the physical properties of the final polyurethane such as impact strength, flexural strength and modulus as well as other properties. The polyols of this invention can be used in applications such as coatings, adhesives, structural foams, reaction injection molding (RIM), thermoset polymers, polymer composites, and the like.

This invention is further illustrated in the following representative examples.

EXAMPLES 1

To a dry powdered sample of Bisphenol-A (114 g) in a reactor equipped with a mechanical stirrer and a thermometer with a temperature controller, kept under a dry nitrogen atmosphere was added 130 g of methyl bicyclic amide acetal (formula I wherein R is methyl and R' is hydrogen). The resulting mixture was stirred continuously and was heated to 80° C. at which point an exothermic reaction occurred. The reaction temperature was maintained at about 90° C. for two hours. The resulting viscous liquid, after cooling, was analyzed by infrared analysis and strong bands were observed at 3400 cm$^{-1}$ (hydroxyl group) and 1720 cm$^{-1}$ (amide group) indicating the formation of a polyol of formula II. GLC analysis of the reaction mixtures showed that the consumption of the starting bicyclic amide acetal and Bisphenol-A had taken place to the extent of greater than 99%. The hydroxyl equivalent weight of the liquid product was found to be 238. The polyol product was found to be miscible with polyols such as ethylene glycol, propylene glycol, dipropylene glycol and the like. A 1:1 (weight) solution of this polyol product with propylene glycol was found to have a viscosity of 680 cps at room temperature.

EXAMPLE 2

The procedure of Example 1 was followed using 110 g of resorcinol and 260 g of the bicyclic amide acetal. The reaction mixture was heated with stirring to 85° C. at which point an exothermic reaction occurred. The reaction temperature was controlled at 95° C. for two hours to give a viscous liquid. The infrared spectrum for this material showed the presence of bands at 3400 cm$^{-1}$ and 1620 cm$^{-1}$ caused by hydroxyl groups and amide groups, respectively, in the molecule thus showing the presence of a phenylene di(ether-amide) diol. The hydroxyl equivalent weight for the product was found to be 192. The product was miscible with propylene glycol, dipropylene glycol, tripropylene glycol and the like.

EXAMPLE 3

The procedure of Example 1 was followed using 105 g of a polyphenol obtained by the condensation reaction of phenol and formaldehyde (Alnovol 320 from American Hoechst) and 130 g of the bicyclic amide acetal. The reaction mixture was heated at 100° C. for two hours to give a highly viscous paste. The infrared spectrum of this product showed bands at 3400 cm$^{-1}$ and 1618 cm$^{-1}$.

EXAMPLE 4

A solution of 18 g of propylene glycol, 10 g of the polyol of Example 1, 6 g of dipropylene glycol, 20 g of poly(propylene oxide) triol (molecular weight 5500) and 0.3 g of N,N',N''-tris(dimethylaminopropyl) hexahydrotriazine was degassed on a rotary evaporator under reduced pressure and was mixed rapidly with 100 g of degassed liquid methylene bis(phenyl isocyanate) (NCO functionality of 2.1 per molecule). The resulting mixture was poured into a mold prepared using two silicone mold release coated glass plates held apart by ⅛ inch thick spacers and heated at 80° C. Polymerization occurred within 15 seconds to give an opaque solid polymer. This polymer was postcured at 110° C. for 20 minutes and was then tested for physical properties. The notched izod impact strength (ASTM D-256) of the polymer was found to be 1.1 foot pounds per inch of notch, the ASTM D-648 heat distortion temperature was 108° C., the yield strength was 16,288 psi, and the flexural modulus was 316,659 psi.

EXAMPLE 5

A solution of 8 g of the polyol of Example 1 dissolved in 18 g of propylene glycol, 4.5 g of dipropylene glycol, 18 g of the reaction product of 2000 molecular weight poly(propylene oxide) diamine with propylene carbonate (1:2 molar ratio) and 09.3 g of N,N',N''-tris(dimethylaminopropyl) hexahydrotriazine was degassed and mixed with 100 g of liquid methylene bis(phenyl isocyanate). In a manner similar to that described in Example 4 the resulting solution was poured into the mold and cured to give an opaque, white solid polymer within 15 seconds. The postcured polymer was found to have a notched izod impact strength of 1.2 foot pounds per inch of notch and a heat distortion temperature of 118° C.

EXAMPLE 6

The procedure of Example 4 was followed using 9 g of the polyol of Example 1, 17 g of propylene glycol, 6 g of dipropylene glycol, 15 g of 4500 molecular weight poly(propylene oxide) triol, 0.3 g of N,N',N''-tris(dimethylaminopropyl) hexahydrotriazine and 100 g of liquid methylene bis(phenyl isocyanate). The resulting solid, opaque, white polymer had a notched izod impact strength of 1 foot pound per inch of notch, a heat distortion temperature of 106° C., a flexural strength of 13,397 psi and a flexural modulus of 339,684 psi.

EXAMPLE 7

The procedure of Example 4 was followed using 28 g of the polyol of Example 2, 28 g of poly(propylene oxide) diol (molecular weight 400), 0.1 g of N,N',N''-tris(dimethylaminopropyl) hexahydrotriazine and 52 g of liquid methylene bis(phenyl isocyanate) prereacted with 10% by weight of a carboxylic acid terminated butadiene/acrylonitrile (18% acrylonitrile in the polymer) Hycar rubber (from B. F. Goodrich Co.). The resulting opaque polymer was found to have a notched izod impact strength of 0.7 foot pounds per inch of notch and a heat distortion temperature of 122° C.

EXAMPLE 8

The procedure of Example 4 was followed using 11 g of the polyol of Example 3, 11 g of propylene glycol, 4 g of dipropylene glycol, 18 g of 5500 molecular weight poly(propylene oxide) triol, 0.3 g of N,N',N''-tris(dimethylaminopropyl) hexahydrotriazine and 100 g of liquid methylene bis(phenyl isocyanate). The resulting opaque, white polymer was found to have a notched izod impact strength of 0.9 foot pounds per inch of notch, and a heat distortion temperature of 112° C.

I claim:

1. The process for preparing a poly(arylene ether-amide) polyol comprising heating a mixture of a bicyclic amide acetal having the formula

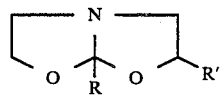

wherein R and R' independently represent hydrogen, an alkyl or an alkyl ether group having from 1 to 20 carbon atoms, an aryl or aryl ether group having from 6 to 12 carbon atoms, an alkaryl or an alkaryl ether group having from 7 to 20 carbon atoms and a polyphenolic compound at a temperature in the range of from about 50° C. to about 150° C.

2. The process of claim 1 wherein the polyphenolic compound is selected from the group consisting of Bisphenol-A, Bisphenol-F, resorcinol, 2,2'-biphenol, 4,4'-biphenol, dihydroxynaphthalene, phenol/formaldehyde resins, tetrachloro Bisphenol-A, and 4,4'-sulfonyl diphenol.

3. The process of claim 2 wherein the mixture contains a ratio of about one mole of bicyclic amide acetal per aromatic hydroxyl group present in the polyphenolic compound.

4. The process of claim 3 wherein the bicyclic amide acetal is one in which R is a methyl group and R' is hydrogen.

5. The process of claim 4 wherein the polyphenolic compound is Bisphenol-A.

6. The process of claim 4 wherein the polyphenolic compound is resorcinol.

7. The process of claim 4 wherein the polyphenolic compound is a phenol-formaldehyde resin.

8. The poly(arylene ether-amide) prepared by the process of claim 1.

* * * * *